(12) United States Patent
Roethig et al.

(10) Patent No.: US 8,669,970 B2
(45) Date of Patent: Mar. 11, 2014

(54) MASTER SYNCHRONIZATION FOR MULTIPLE DISPLAYS

(75) Inventors: Wolfgang Roethig, San Jose, CA (US);
Michael Frank, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 422 days.

(21) Appl. No.: 13/014,928

(22) Filed: Jan. 27, 2011

(65) Prior Publication Data

US 2012/0194487 A1    Aug. 2, 2012

(51) Int. Cl.
*G09G 5/00* (2006.01)

(52) U.S. Cl.
USPC .......................................................... 345/204

(58) Field of Classification Search
USPC .............. 345/1.1–3.1, 213–215, 3.2
See application file for complete search history.

(56) References Cited

U.S. PATENT DOCUMENTS

| | | | |
|---|---|---|---|
| 6,389,041 B1 * | 5/2002 | Morita et al. ................. | 370/503 |
| 6,646,645 B2 | 11/2003 | Simmonds et al. | |
| 6,864,891 B2 | 3/2005 | Myers | |
| 7,176,848 B1 * | 2/2007 | Dai et al. ....................... | 345/2.2 |
| 7,499,044 B2 | 3/2009 | Kennedy et al. | |
| 7,804,497 B2 | 9/2010 | Song et al. | |
| 2002/0180725 A1 * | 12/2002 | Simmonds et al. ........... | 345/213 |
| 2003/0142089 A1 * | 7/2003 | Myers ............................ | 345/213 |
| 2005/0093854 A1 * | 5/2005 | Kennedy et al. .............. | 345/213 |
| 2007/0057865 A1 * | 3/2007 | Song et al. .................... | 345/1.1 |
| 2007/0147517 A1 * | 6/2007 | Hu ............................ | 375/240.27 |
| 2009/0295786 A1 * | 12/2009 | Ito et al. ....................... | 345/215 |

\* cited by examiner

*Primary Examiner* — Abbas Abdulselam
(74) *Attorney, Agent, or Firm* — Lawrence J. Merkel; Meyertons, Hood, Kivlin, Kowert & Goetzel, P.C.

(57) ABSTRACT

In an embodiment, a display apparatus includes multiple physical interface circuits (PHYs) couple to respective displays. In a mirror mode, the PHYs may operate as masters. A primary master PHY may control a synchronization interface to one or more secondary master PHYs. The synchronization interface may include a start of frame signal that the primary master PHY may generate to indicate the beginning of a new frame. The secondary master PHYs may be configured to generate internal start of frame signals while independently processing the same display data as the primary master. If the internally-generated start of frame and the received start of frame occur within a window of tolerance of each other, then the secondary masters may continue to process the display data stream independently. A secondary master that detects the start of frames occur outside of the window of tolerance may resynchronize.

24 Claims, 7 Drawing Sheets

MASTER SYNCHRONIZATION FOR MULTIPLE DISPLAYS

BACKGROUND

1. Field of the Invention

This invention is related to the field of video displays and other user interface devices for digital systems.

2. Description of the Related Art

Digital systems typically include at least one video display device to display images to a user of the system. The images may be computing desktops, video sequences, combinations of the two, etc.

In some cases, digital systems may include more than one display. The displays can be used independently, such as when multiple displays are used to form a large virtual desktop that extends across the displays. Accordingly, the interfaces to the displays and at least some of the related processing circuitry are separate for each display. However, it is also desirable to be able display the same images concurrently on each of the displays. For example, the system may include connections to connect to one or more external displays, as when the digital device is begin used to show a presentation to an audience in a large room. The presenter may view the display on the system itself, and the audience may view the presentation on the external displays.

When the displays are used to display the same images, the interface circuitry and other per-display circuitry is typically operated in slave mode with a common master. The master transmits timing signals in addition to the display data stream to each slave.

SUMMARY

In an embodiment, a display apparatus includes multiple physical interface circuits (PHYs) configured to couple to respective displays. In a mirror mode in which the displays are to concurrently display a same one or more frames, the PHYs may be configured to operate in master mode. One of the PHYs may be designated the primary master, and the primary master PHY may control a synchronization interface to one or more secondary master PHYs. The synchronization interface may, for example, include a start of frame signal that the primary master PHY is configured to generate to indicate that the primary master PHY is beginning to display a new frame. The secondary master PHYs may be configured to generate internal start of frame signals while independently processing the same display data as the primary master. If the internally-generated start of frame and the received start of frame occur within a window of tolerance of each other, then the secondary masters may continue to process the display data stream independently. A secondary master that detects the start of frames occur outside of the window of tolerance may be configured to resynchronize to the primary master and begin independent display again.

BRIEF DESCRIPTION OF THE DRAWINGS

The following detailed description makes reference to the accompanying drawings, which are now briefly described.

Figure 1:
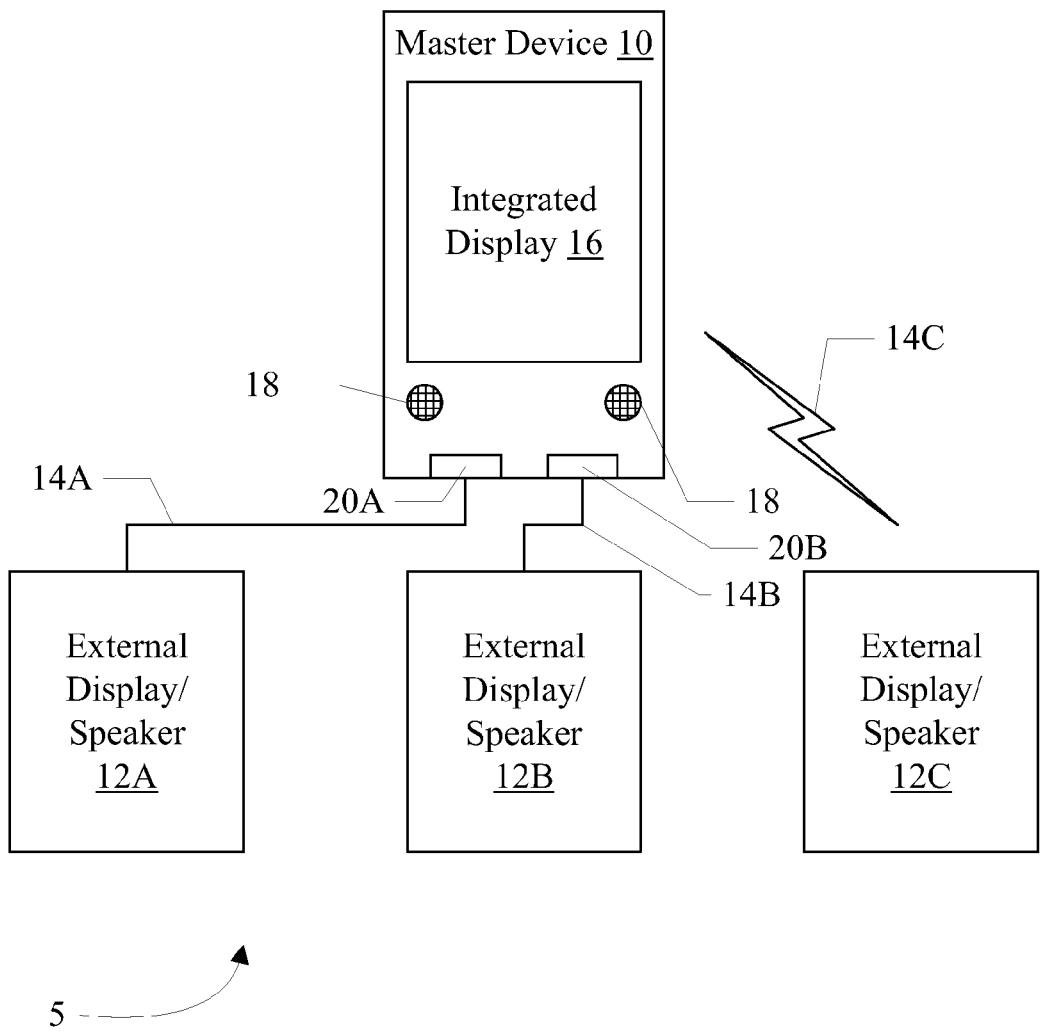
FIG. 1 is a block diagram of one embodiment of a master device coupled to one or more external displays/speakers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 5 is shown. In the illustrated embodiment, the system 5 may include a master device 10 and one or more external displays and/or speakers 12A-12C. The external display/speakers 12A-12C may be coupled to the master device 10. For example, the external display/speakers 12A-12B may be connect to the master device 10 over wired connections 14A-14B. The wired connection may include any control interface for a display (e.g. red-green-blue (RGB) signals, chrominance-luminance interfaces (YCrCb), etc.). The external display/speaker 12C may be wirelessly connected (14C) to the master device 10. For example, a bluetooth or wireless fidelity (WiFi) wireless connection 14C may be used.

The master device 10 may include an integrated display 16, one or more speakers 18, and one or more connectors 20A-20B to connect to external displays/speakers 12A-12B. The integrated display 16 may be part of the device 10. For example, the master device 10 may be any type of portable digital system (e.g. a smart phone, a personal digital assistant (PDA), a laptop computer, a net top computer, a tablet computer, etc.). The housing that includes the computing hardware of the system 10 may also include the integrated display 16. In other embodiments, the display 16 may not be integrated (e.g. a desktop computer system may be the master device 10), but the display 16 may be the primary display viewed by the user of the device 10. The speakers 18 may be integrated into the master device 10 as well. Alternatively or in addition, the device 10 may include a connection for headphones, ear buds, or other forms of speakers.

The master device 10 may be configured to operate in at least two modes. In the first mode, referred to as mirrored mode herein, the master device 10 is to concurrently display a same set of frames on the integrated display 16 and the external displays 12A-12C. The set of frames may be a video sequence, frames displayed by presentation software such as PowerPoint® from Microsoft® Corporation, Impress from Open Office, or Keynote from Apple Inc., etc. In the non-mirrored mode, the displays 16 and 12A-12C may display different sets of frames.

Similarly, an embodiment may operate the speakers 18 and the external speakers 12A-12C in a mirrored or non-mirrored mode. Accordingly, more generally, the system 5 may include various user interface devices that are configured to provide information to a user (e.g. audio or video information), and the user interface devices may be operated in mirrored mode or non-mirrored mode. The video displays and speakers (including headphones, ear buds, etc.) may be examples of user interface devices. In the mirrored mode, the user interface devices may present the same information concurrently. Thus, the mirrored mode may be a synchronized mode in which the user interface devices are synchronized. For the remainder of this description, an embodiment that synchronizes video displays in mirrored mode will be described. However, similar embodiments may be used for audio devices or other user interface devices As used herein, a display may include any device that is configured to present a visual image in response to control signals to the display. A variety of technologies may be used in the display, such as cathode ray tube (CRT), thin film transistor (TFT), liquid crystal display (LCD), light emitting diode (LED), plasma, etc. The displays may also include touch screen input functionality, in some embodiments. The display devices may also be referred to as panels, in some cases.

Figure 2:
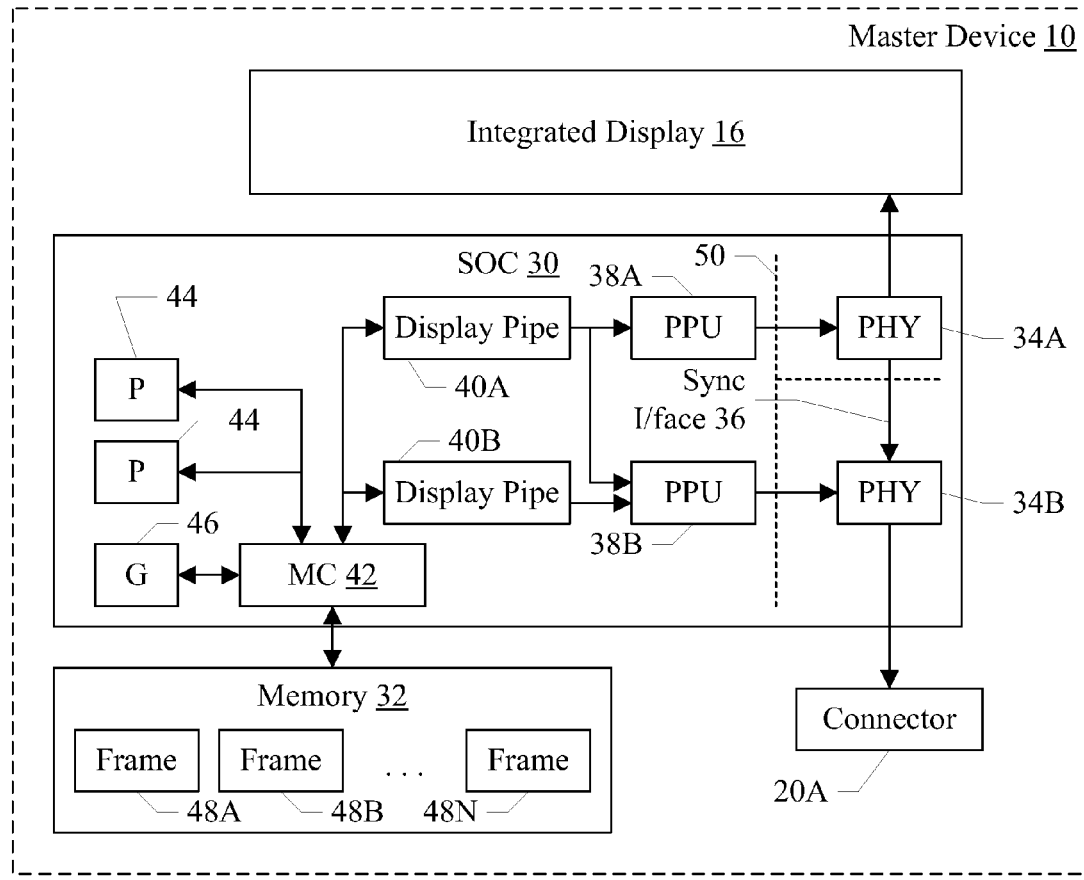
FIG. 2 is a block diagram of one embodiment of the master device in more detail.

Turning next to FIG. 2, a block diagram of one embodiment of the master device 10 is shown in more detail. In the embodiment of FIG. 2, the master device 10 includes the integrated display 16, a system on a chip 30, memory 32, and the connector 20A. Other embodiments may include additional connectors and/or wireless interfaces to coupled to additional displays. The SOC 30 is coupled to the memory 32. Additionally, the SOC 30 (and more particularly the PHYs 34A-34B, respectively) are coupled to the integrated display 16 and the connector 20A. The PHYs 34A-34B are coupled via a synchronization interface 36, and are respectively coupled to pixel processing units 38A-38B. The pixel processing unit 38A is coupled to a display pipe 40A. The pixel processing unit 38B is coupled to the display pipe 40A and a display pipe 40B. The display pipes 40A-40B are coupled to a memory controller 42, which is coupled to one or more processors 44 and a graphics controller 46. Other embodiments may include one processor 44, or more than two processors. Other embodiments may include more than one graphics controller 46. The memory controller 42 is further coupled to the memory 32. The memory 32 is configured to store data and instructions, including various frames 48A-48N for display.

The display pipes 40A-40B may each be configured to read frame data from the frames 48A-48N in the memory 32 (through the memory controller 42), and to process the frame data to provide a stream of pixel values for display. The display pipes 40A-40B may provide a variety of operations on the frame data (e.g. scaling, video processing for frames that are part of a video sequence, etc.). Additionally, the display pipes 40A-40B may be configured to blend multiple frames to produce an output frame. For example, in one embodiment, each frame pixel may have an associated alpha value indicating its opaqueness. More particularly, each of the display pipes 40A-40B may include one or more user interface blocks configured to fetch and process static frames (that is, frames that are not part of a video sequence) and one or more video pipelines configured to fetch and process frames that are part of a video sequence. The frames output by the user interface units may be blended with a video frame output by the video pipeline. The display pipes 40A-40B may be configured to provide the output pixel stream to the pixel processing units (PPUs) 38A-38B.

Generally, a pixel value in a stream of pixel values may be a representation of a pixel to be displayed on the displays 16 and/or 12A-12C. The pixel value may include a one or more color space values. For example, in an RGB color space, the pixel value includes a red value, a green value, and a blue value. Each value may range from zero to $2^N-1$, and describes an intensity of the color for that pixel. Similarly, in the YCrCb color space, the pixel value includes a Y value, a Cr value, and a Cb value. The location of a the pixel on the display may be inferred from the position of the corresponding pixel value in the pixel stream. For example, the pixel stream may be a series of rows of pixels, each row forming a line on the display screen. In a progressive-mode display, the lines are drawn in consecutive order and thus the next line in the pixel stream is immediately adjacent to the previous line. In an interlaced-mode display, consecutive passes over the display draw either the even or the odd lines, and thus the next line in the pixel stream skips one line from the previous line in the pixel stream. For 3 dimensional (3D) displays, pixels may also be right or left camera, although the right or left camera may be displayed as consecutive frames in the sequence. For brevity, the stream of pixel values may be referred to as a pixel stream, or a stream of pixels.

The pixel stream output by the display pipe 40A may be input to both the PPUs 38A-38B, and the pixel stream output by the display pipe 40B may be input to the PPU 38B. In non-mirrored mode, the display pipe 40A provides the pixel stream to the integrated display 16 (through the PPU 38A and the PHY 34A). For mirrored mode, the pixel stream provided by the display pipe 40A may be the pixel stream to be displayed on each display, and thus may be provided to the PPU 38B (and any other PPUs that may be included in other embodiments for other displays). In mirrored mode, the PPU 38B may be configured to select the pixel stream from the display pipe 40A instead of the pixel stream from the display pipe 40B. In non-mirrored mode, the PPU 38B may be configured to select the pixel stream from the display pipe 40B.

The pixel processing units 38A-38B may be configured to perform various pixel operations on the pixel stream and may provide the processed pixel stream to the respective PHYs 34A-34B. Generally, a pixel operation may be any operation that may be performed on a stream of pixels forming a line on a display. For example, pixel operations may include one or more of: color space conversions, backlight control, gamma correction, contrast ratio improvement, filtering, dithering, etc. By having separate, per-display PPUs, display-specific pixel operations may be performed in mirrored mode. For example, different displays may support different sets of features. Alternatively, the backlight, contrast ratio, etc. that may be desirable on the integrated display 16 for viewing by the user of the master device 10 may not be the same as those that may be desirable for displays viewed by an audience for a presentation. Accordingly, while the image to be displayed may be the same for each PPU 38A-38B in mirrored mode, properties of the image may be modified in different ways.

Clock domain boundaries are illustrated in FIG. 2 via dotted lines 50. Thus, in this embodiment, the display pipes 40A-40B and the PPUs 38A-38B are in one clock domain, the PHY 34A is an another clock domain, and the PHY 34B is in still another clock domain. Generally, a clock domain may refer to the circuitry that is controlled responsive to a given clock. Clocked storage devices such as latches, registers, flops, etc. may all be configured to launch and capture values responsive to the given clock, either directly or indirectly. That is, the clock received by a given clocked storage device may be the given clock or a clock that is derived from the given clock. On the other hand, clocked storage devices in a different clock domain launch/capture values responsive to a different clock that may not have a synchronous relationship to the given clock.

Since the PPUs 38A-38B and the display pipes 40A-40B are in the same clock domain, the synchronization among these units in mirrored mode may occur naturally. However, the PHYs 34A-34B may be in the clock domains that correspond to their respective displays 16 and 12A. Accordingly, the receipt of pixels by a given PHY 34A-34B and the display thereof may not be guaranteed without active synchronization.

In the illustrated embodiment, the PHY 34A is configured to drive the synchronization interface 36 and the PHY 34B is configured to monitor the synchronization interface in mirrored mode. The PHYs 34A-34B may both operate as masters, independently receiving pixels from the PPUs 38A-38B, respectively. However, the PHY 34A (the primary master in this embodiment, since it is the PHY that controls the integrated display 16) may be configured to periodically indicate, over the synchronization interface, the progress of the PHY 34A in displaying the pixel stream. For example, the PHY 34A may signal that the PHY 34A is beginning the display of the next frame in the pixel stream by signalling a start of frame on the synchronization interface 36. There may be a start of frame signal on the interface 36 that may be asserted by the PHY 34A and monitored by the PHY 34B. The PHY 34B may generate its own start of frame signal based on the progress of the PHY 34B in displaying frames from the pixel stream, and may compare the timing of the start of frame signals to determine how close the PHYs 34A-34B are in terms of frame display.

Additionally, in response to entering mirrored mode, an initial start of frame signalled on the interface 36 may serve as a trigger for the PHY 34B to begin display of the initial frame. That is, the PHY 34B may detect that mirrored mode has been entered, and may stall frame display until the start of frame is signalled on the synchronization interface 36

The synchronization interface may have any form and implementation, and may carry any desired information in various embodiments. For example, a start indication may be used as a trigger to begin mirrored mode display, and a periodic timestamp may be transmitted on the synchronization interface to indicate the progress of the primary master 34A in the mirrored stream. In this embodiment, the start of frame may be used as both a trigger and a progress indicator. In embodiment that employ interlaced and/or 3D display, a field indication may be provided indicating which field of the frame is being displayed (e.g. odd or even field for interlaced, or left or right camera for 3D, or both).

As mentioned previously, other embodiments may implement a mirrored mode and non-mirrored mode for other user interface devices. For example, audio devices may implement the mirrored and non-mirrored modes. A primary master audio PHY may be configured to assert a synchronizing a signal to begin audio playback and to periodically assert the synchronizing signal again during the playback. The period for asserting the synchronizing signal may be based on time, or based on progress through the data representing the sound. Secondary master audio PHYs may determine if the audio stream is in synchronization within an acceptable tolerance, and may operate independently as long as the window of tolerance is achieved. Once the tolerance is exceeded, a secondary master audio PHY may resynchronize to the primary master audio PHY.

The PHYs 34A-34B may generally including the circuitry that physically controls the corresponding displays. The PHYs 34A-34B may drive control signals that physically control the respective display panels in response to the pixel values. Thus, for example, a display that is controlled by RGB signals may include transmitting voltages on the R, G, and B signals that correspond to the R, G, and B components of the pixel. There may also be a display clock that may be transmitted by the PHYs 34A-34B, or the display clock may be embedded in one of the control signals. Thus, the PHYs 34A-34B may be an example of a display driving circuit, Generally, a frame may be data describing an image to be displayed. A frame may include pixel data describing the pixels included in the frame (e.g. in terms of various color spaces, such as RGB or YCrCb), and may also include metadata such as an alpha value for blending. Static frames may be frames that are not part of a video sequence. The adjective "static" is not intended to indicate that the static frames do not change or cannot be changed. A static frame may be a complete image. Video frames may be a frames in a video sequence. Each frame in the video sequence may be displayed after the preceding frame, at a rate specified for the video sequence (e.g. 15-30 frames a second). Video frames may also be complete images, or may be compressed images that refer to other images in the sequence. If the frames are compressed, the video pipeline in the display pipe may decompress the frames as part of processing the frames. Accordingly, the frames 48A-48N may include static frames, video frames, and/or a combination of static and video frames at various points in time during use.

The processors 44 may implement any instruction set architecture, and may be configured to execute instructions defined in that instruction set architecture. The processors 44 may employ any microarchitecture, including scalar, superscalar, pipelined, superpipelined, out of order, in order, speculative, non-speculative, etc., or combinations thereof. The processors 44 may include circuitry, and optionally may implement microcoding techniques. The processors 44 may include one or more level 1 caches, and there may be other levels of cache between the processors 44 and the memory controller 42. Other embodiments may include multiple levels of caches in the processors 44, and still other embodiments may not include any caches between the processors 44 and the memory controller 42.

The graphics controller 46 may include any graphics processing circuitry. Generally, the graphics controller 46 may be configured to render objects to be displayed into a frame buffer in the memory 32 (e.g. the frames 48A-48N may each be stored in a frame buffer). The graphics controller 46 may include one or more graphics processors that may execute graphics software to perform a part or all of the graphics operation, and/or hardware acceleration of certain graphics operations. The amount of hardware acceleration and software implementation may vary from embodiment to embodiment.

Generally, the memory controller 42 may comprise any circuitry configured to interface to the various memory requestors (e.g. the processors 44, the graphics controller 46, the display pipes 40A-40B, etc.). Any sort of interconnect may be supported between the memory controller 42. For example, a shared bus (or buses) may be used, or point-to-point interconnects may be used. Hierarchical connection of local interconnects to a global interconnect to the memory controller 42 may be used. In one implementation, the memory controller 42 is multi-ported and the processors 44 may have a dedicated port, the graphics controller 46 may have another dedicated port, and the display pipes 40A-40B may have still another dedicated port.

The memory 32 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the SOC 30 in a chip-on-chip configuration, a package-on-package configuration, or a multi-chip module configuration.

In the illustrated embodiment, the components illustrated with the SOC 30 may be integrated onto a single integrated circuit chip. Other embodiments may employ any amount of integrated and/or discrete implementations.

Figure 3:
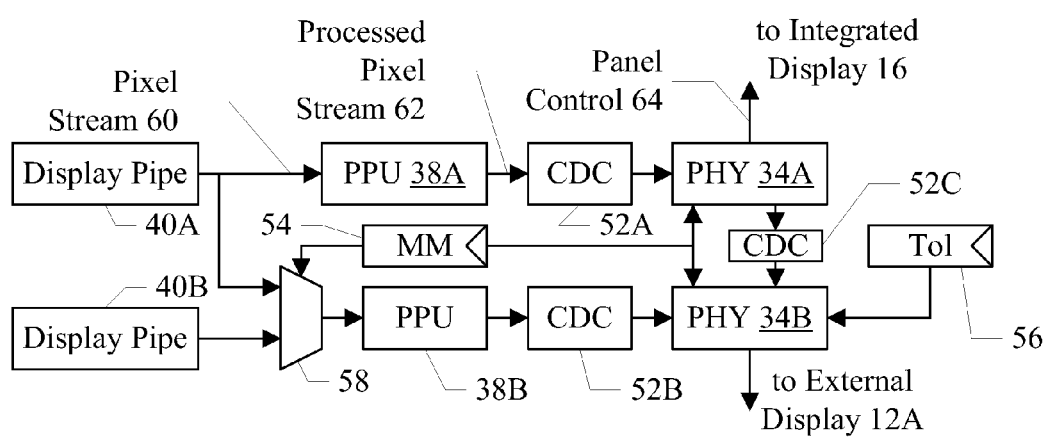
FIG. 3 is a block diagram of one embodiment of a portion of the display apparatus in the master device shown in FIG. 2.

Turning now to FIG. 3, one embodiment of a portion of the SOC 30 is shown in greater detail. The portion illustrated in FIG. 3 includes the display pipes 40A-40B, the PPUs 38A-38B, and the PHYs 34A-34B. FIG. 3 further illustrates clock domain crossing (CDC) circuits 52A-52C, a mirrored-mode register 54, a tolerance register 56, and a multiplexor (mux) 58.

The PPU 38A is coupled to receive a pixel stream 60, which is also in input to the mux 58. The mux 58 is further coupled to receive the pixel stream from the display pipe 40B as an input, and is coupled to receive a selection control from the mirrored mode register 54. The PPU 38B is coupled to receive the output of the mux 58 as an input pixel stream. Accordingly, in mirrored mode, the selection control from the register 54 may select the pixel stream 60 from the display pipe 40A for the PPU 38B. In non-mirrored mode, the selection control from the register 54 may select the pixel stream from the display pipe 40B for the PPU 38B.

The PPUs 38A-38B are configured to output processed pixel streams (e.g. the processed pixel stream 62 from the PPU 38A). The CDCs 52A-52B are coupled to receive the respective processed pixel streams, and may be configured to manage the clock domain crossing from the clock domain of the PPUs 38A-38B (and the display pipes 40A-40B in this embodiment) to the clock domains of the PHYs 34A-34B respectively. The clock domain of the PPUs 38A-38B and the display pipes 40A-40B may be referred to as a pixel source clock domain, the clock domains of each of the PHYs 34A-34B may be referred to as pixel sink clock domains. The processed pixel streams may thus be received into the PHYs 34A-34B, which may generate the corresponding panel control signals (e.g. panel control 64 in FIG. 3 from the PHY 34A to the integrated display 16).

The synchronization interface 36 may be passed through the CDC circuit 52C from the PHY 34A to the PHY 34B. The PHYs 34A-34B may be coupled to the mirrored mode register 54 to detect whether or not mirrored mode is in effect. The PHY 34A may be configured to determine whether or not to drive the synchronization interface 36 responsive to the mirrored mode, and the PHY 34B may be configured to determine whether or not to monitor the synchronization interface 36 responsive to the mirrored mode. Particularly, the PHY 34A may be configured to drive the synchronization interface 36 and the PHY 34B may be configured to monitor the synchronization interface 36 in the mirrored mode. The PHY 34A may be configured to idle the synchronization interface 36 and the PHY 34B may be configured to ignore the synchronization interface 36 in the non-mirrored mode.

The PHY 34B may further be coupled to the tolerance register 56, which may be programmed with the tolerance for the synchronization between the PHYs 34A-34B. The tolerance may be measured in any desired fashion, and the measurement may depend on the definition of the synchronization interface 36. In the present embodiment, the start of frame signal may be the synchronization indication and the tolerance may measure the acceptable distance (in time) between corresponding assertions of the start of frame signal from the PHY 34A and the corresponding start of frame generated internally by the PHY 34B. The tolerance may be measured in any units (e.g. clock cycles of the clock corresponding to the clock domain of the PHY 34B, real time, etc.). In other embodiments, the tolerance may be fixed and the tolerance register 56 may not be needed. Generally, the tolerance may be non-zero and may permit some amount of skew between the PHYs 34A-34B.

If the tolerance specified in the register 56 is exceeded by corresponding start of frame indications, the PHY 34B may resynchronize to the PHY 34A. In cases in which there are additional secondary master PHYs (not shown), each secondary master PHY may be coupled to the tolerance register 56 and may individually detect whether or not the tolerance is exceeded. Each such secondary master PHY may independently resynchronize with the primary master PHY 34A, and thus a resynchronization by one secondary master PHY need not cause another secondary master PHY to resynchronize. Resynchronization may include, e.g., stalling pixel display in the secondary master PHY (if the secondary master PHY is ahead of the primary master PHY), or discarding frame data to begin displaying the next frame (if the secondary master PHY is trailing the primary master PHY). On the other hand, if the tolerance is not exceeded by the respective start of frame indications, the PHYs 34A-34B may continue displaying pixels independently (or in so-called "free-running" mode).

The registers 54 and 56 may be implemented as one physical register in some embodiments, but have been illustrated separately for convenience in FIG. 3. Other embodiments may use separate physical registers. The registers 54 and 56 may be logically addressed (e.g. by software that programs the registers) as a single register or separate registers, independent of the physical implementation.

The CDC circuits 52A-52C may implement any clock domain crossing functionality that safely transmits data/signals from one clock domain to another. That is, the CDC circuits 52A-52C may ensure that metastability problems do not occur and that the data is not corrupted in crossing the clock domain. For example, double synchronization (two clocked storage devices in series, clocked by the clock corresponding to the receiving clock domain) may be used. In other embodiments, a first-in, first-out buffer (FIFO) may be used. In one implementation, the CDC circuits 52A-52B may be FIFOs configured to buffer pixels (e.g. up to a line of pixels). The PHYs 34A-34B may request pixels from the respective FIFOs 52A-52B (popping the pixels from the FIFOs) to receive the pixels. The CDC circuit 52C may be a double synchronization implementation, or may also be a FIFO, as desired.

Figure 4:
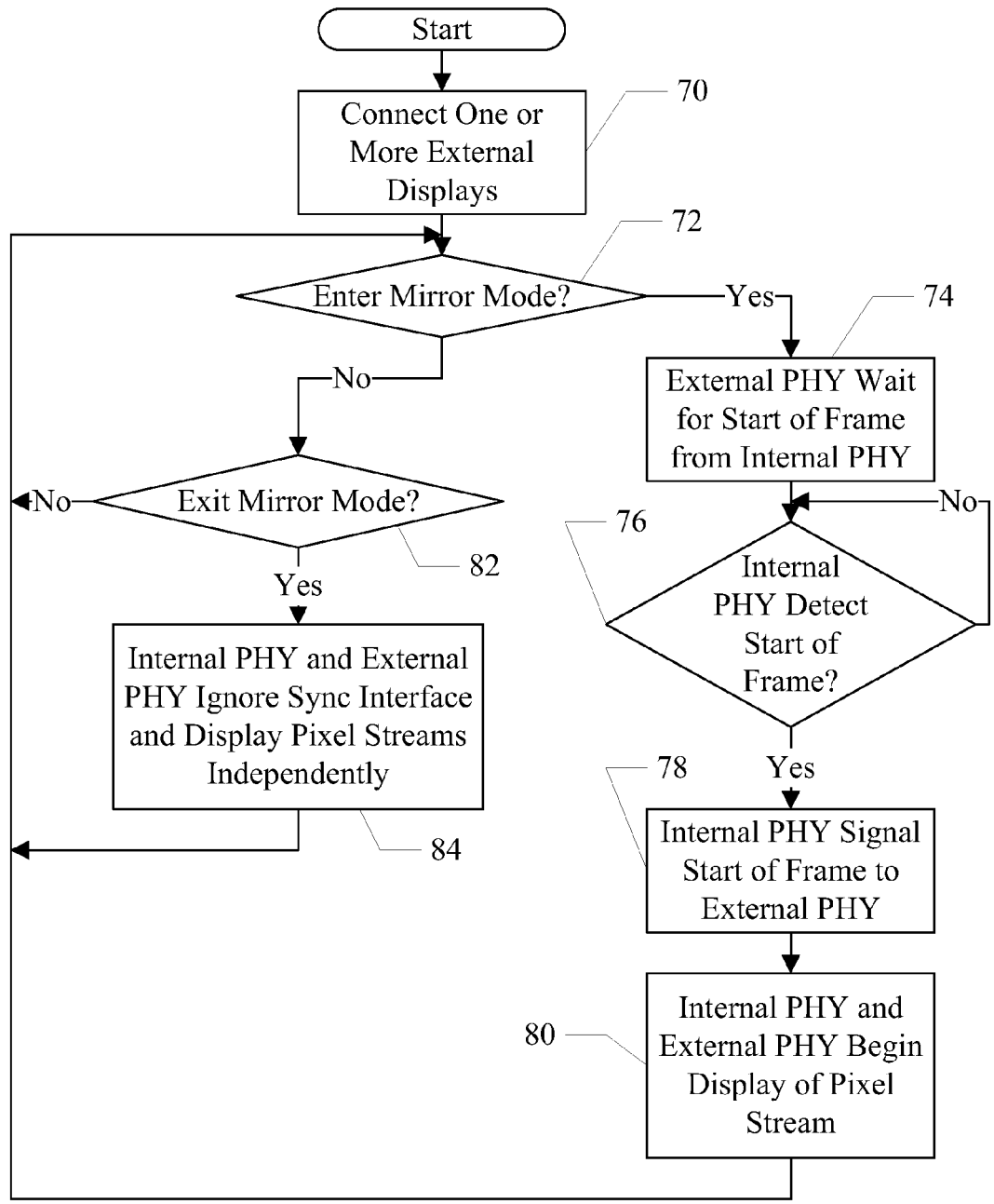
FIG. 4 is a flowchart illustrating operation of one embodiment of the master device/display apparatus to enter and exit a mirror mode.

Turning now to FIG. 4, a flowchart illustrating operation of the system 5 for one embodiment is shown. While the blocks are shown in a particular order for ease of understanding, other orders may be used. Blocks may be performed in parallel in combinatorial logic within the system 5. Blocks, combinations of blocks, and/or the flowchart as a whole may be pipelined over multiple clock cycles.

The master device 10 may be connected to one or more external displays 12A-12C (block 70). The connections may be physical, wired connections, wireless connections, or a combination thereof, in various embodiments. The connections may also be made through one or more intervening devices, if desired.

If the master device 10 enters mirrored mode (decision block 72, "yes" leg), the PHYs coupled to the external displays may wait for the start of frame indication from the PHY 34A (block 74). The PHYs coupled to the external displays 12A-12C may be referred to as "external PHYs," and the PHY coupled to the integrated display 16 may be referred to as an "internal PHY." The master device 10 may enter mirrored mode if, e.g., the register 54 is written with a value that enables mirrored mode. For example, the value may be a bit indicative of mirrored mode when set and non-mirrored mode when clear (or vice-versa). The internal PHY 34A may detect the start of a frame in the mirrored mode (decision block 76, "yes" leg), and may signal the start of frame on the synchronization interface 36 to one or more external PHYs such as PHY 34B (block 78). The external PHY 34B may trigger the display of the pixel stream in response to the start of frame. Both the internal PHY 34A and the external PHY 34B may begin display of the pixel stream (block 80). Both PHYs 34A-34B may display the pixel stream at their own clock rate, independently (or free-running).

If the master device 10 exits mirror mode (decision block 82, "yes" leg), the PHYs 34A-34B may ignore the synchronization interface 36 and may display pixel streams completely independently (block 84). That is, the PHY 34A may cease driving the synchronization interface 36 and the PHY 34B may cease monitoring the synchronization interface.

Figure 5:
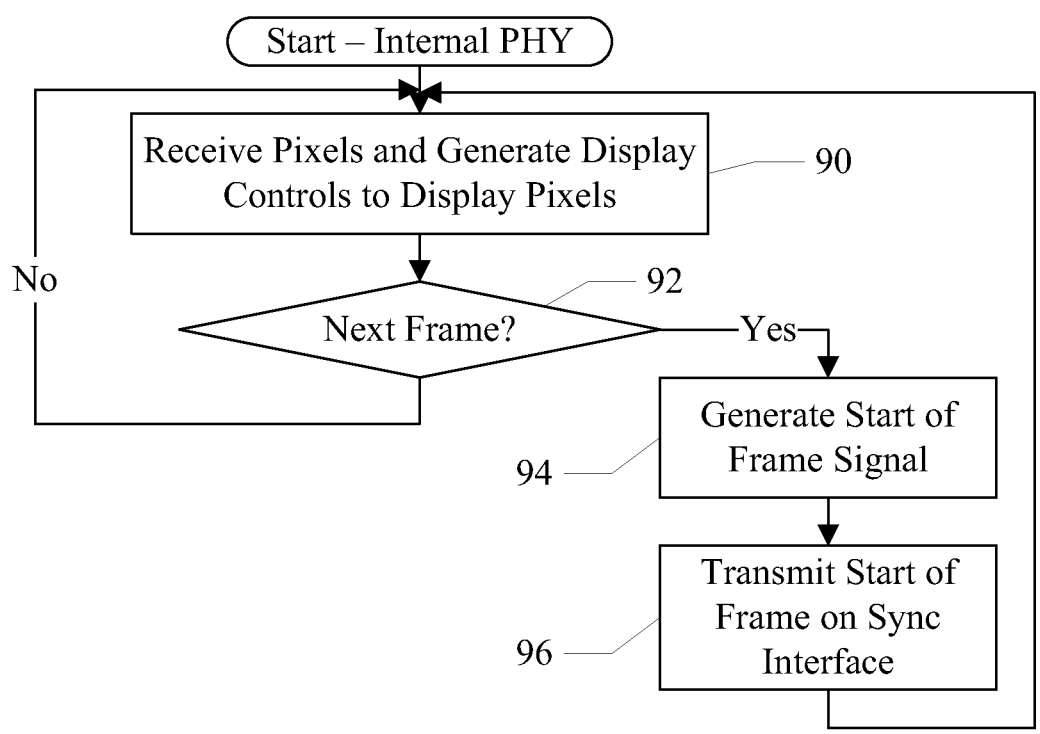
FIG. 5 is a flowchart illustrating operation of one embodiment of an internal PHY shown in FIGS. 2 and 3.

Turning now to FIG. 5, a flowchart illustrating operation of internal PHY 34A in the mirrored mode for one embodiment is shown. While the blocks are shown in a particular order for ease of understanding, other orders may be used. Blocks may be performed in parallel in combinatorial logic within the internal PHY 34A. Blocks, combinations of blocks, and/or the flowchart as a whole may be pipelined over multiple clock cycles.

The internal PHY 34A may receive pixels and generate display control signals for the integrated display 16 to display the pixels (block 90). The internal PHY 34A may, for example, request the pixels from the CDC circuit 52A in order to receive the pixels. If the internal PHY 34A reaches the end of the frame and is preparing to display the next frame (decision block 92, "yes" leg), the internal PHY 34A may generate the start of frame signal and transmit the signal on the synchronization interface 36 (blocks 94 and 96). Reading the end of frame may be detected, e.g. by detecting the vertical blanking interval between frames.

Figure 6:
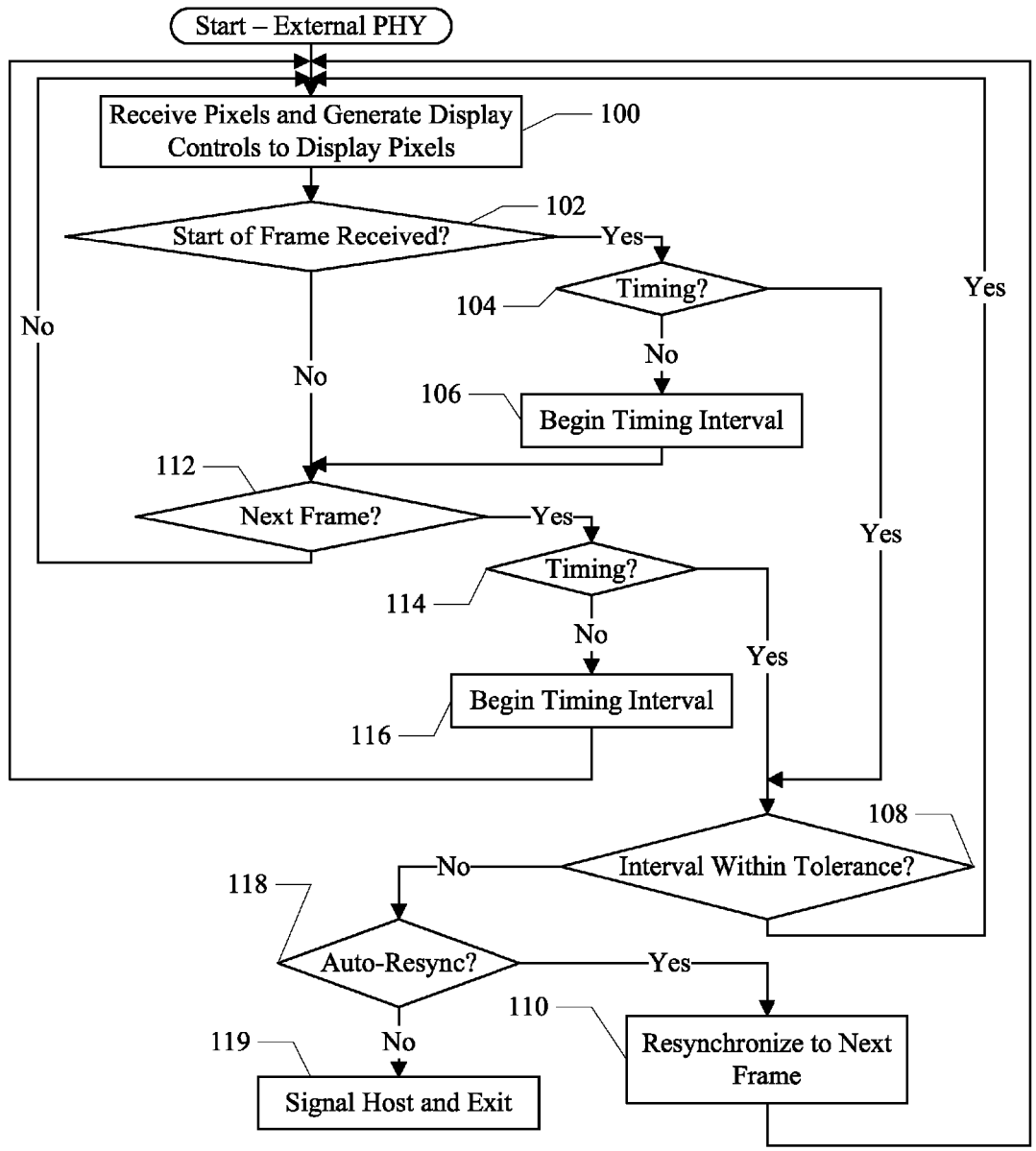
FIG. 6 is a flowchart illustrating operation of one embodiment of an external PHY shown in FIGS. 2 and 3.

Turning now to FIG. 6, a flowchart illustrating operation of external PHY 34B in the mirrored mode for one embodiment is shown. While the blocks are shown in a particular order for ease of understanding, other orders may be used. Blocks may be performed in parallel in combinatorial logic within the external PHY 34B. Blocks, combinations of blocks, and/or the flowchart as a whole may be pipelined over multiple clock cycles.

Similar to the internal PHY 34A, the external PHY 34B may receive pixels (e.g. by requesting them from the CDC circuit 52B) and may generate the display control signals to display the pixels on the corresponding external display 12A (block 100). The external PHY 34B may request and receive pixels at its own clock rate and synchronous to its clock, independent of the internal PHY 34A. Since the mirrored mode is active, the external PHY 34B may also be monitoring the synchronization interface 36. When the start of frame indication is received on the synchronization interface 36, the PHY 34B may already be displaying the corresponding frame (PHY 34B is ahead of PHY 34A) or the PHY 34B may not yet be displaying the corresponding frame (PHY 34B is behind PHY 34A). Accordingly, whenever the PHY 34B detects a start of frame internally or receives the start of frame indication, the PHY 34B may begin a timing interval. When the opposite signal is detected, the PHY 34B may terminate the interval and check that the interval is within the tolerance indicated in the tolerance register 56. This operation is described in more detail below.

If the start of frame indication is received on the synchronization interface 36 (decision block 102, "yes" leg), and the PHY 34B is not already measuring a timing interval (decision block 104, "no" leg), the PHY 34B may be begin a timing interval (block 106). In this case, the PHY 34A is ahead of the PHY 34B. On the other hand, if the PHY 34B is already measuring a timing interval (decision block 104, "yes" leg), the PHY 34B may determine if the interval is within the tolerance (decision block 108). If so (decision block 108, "yes" leg), the PHY 34B may continue displaying pixels independently. If not (decision block 108, "no" leg), the PHY 34B may determine if the PHY 34B is programmed for automatic resynchronization (auto-resync) (decision block 118). If so (decision block 118, "yes" leg), the PHY 34B may resync to the PHY 38A on the next frame (block 110). If the PHY 34B is not programmed for auto-resync (e.g. a "manual mode", decision block 118, "no" leg), the PHY 34B may signal the host to indicate the loss of synchronization (block 119). For example, the PHY 34B may signal an interrupt to one of the processors 44. The processors 44 may execute code in response to the interrupt to determine whether or not to restart the displays in synchronization mode and when to do so. In other embodiments, the PHY 34B may signal the host in other ways to report loss of synchronization. For example, the PHY 34B may transmit a message to a processor, may write a predefined memory location with an indication of loss of synchronization, may record the loss of synchronization in a register accessible to software, etc. Other embodiments may not have an auto-resync mode and may signal the host whenever loss of synchronization is detected. Still other embodiments may not report loss of synchronization to software (e.g. the PHY 34B may always attempt to resynchronize to the primary master in such embodiments).

If the start of frame indication is not received on the synchronization interface 36 (decision block 102, "no" leg) but the PHY 34B detects that it has reached the end of the frame (decision block 112, "yes" leg), the PHY 34B may again determine if it is already measuring a timing interval (decision block 114). If the PHY 34B is not already measuring a timing interval (decision block 114, "no" leg), the PHY 34B may be begin a timing interval (block 106). In this case, the PHY 34A is behind the PHY 34B. On the other hand, if the PHY 34B is already measuring a timing interval (decision block 114, "yes" leg), the PHY 34B may determine if the interval is within the tolerance (decision block 108). If so (decision block 108, "yes" leg), the PHY 34B may continue displaying pixels independently. If not (decision block 108, "no" leg), the PHY 34B may resync to the PHY 34A on the next frame (block 110) or signal the host (block 119) depending on whether or not auto-resync is active (decision block 118).

Figure 7:
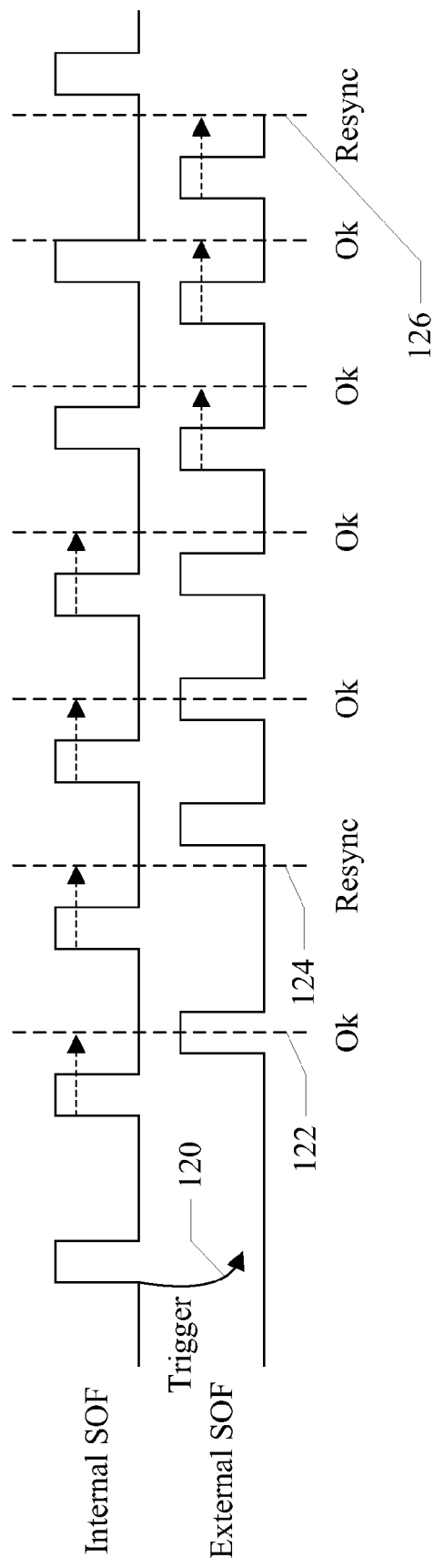
FIG. 7 is a timing diagram illustrating start of frame signals for one embodiment.

FIG. 7 is a timing diagram of an example illustrating the internal PHY 34A's start of frame (SOF) (illustrated as "Internal SOF" in FIG. 7) and the external PHY 34B's detection of the SOF (illustrated as "External SOF" in FIG. 7). The tolerance is illustrated via the horizontal arrow for the first SOF detected to the vertical dashed line. The time between frames is not illustrated to scale in this drawing. The initial SOF detected by the internal PHY 34A serves as the trigger for the external PHY 34B (arrow 120). Both PHYs 34A-34B begin displaying the first frame. In this example, the PHY 34A finishes the first frame before the PHY 34B, and asserts the SOF. Subsequently, the PHY 34B finishes the first frame and detects its SOF. Since the rising edge of the external SOF occurs before the dotted line indicating the tolerance (reference numeral 122), the SOFs are within the tolerance and independent processing continues.

On the second frame, the PHY 34A again finishes first and asserts the SOF. In this case, the PHY 34B finishes outside of the acceptable tolerance (reference numeral 124). Accordingly, the PHY 34B resyncs to the PHY 34A on the next frame. During subsequent frames. The timing of the SOFs is within the tolerance and thus there is no resyncing and the PHYs 34A-34B continue processing independently. Over time, the PHY 38B gets ahead of the PHY 34A, and eventually the PHY 34A is behind the PHY 34B by greater than the tolerance (reference numeral 126). The PHY 34B resyncs to the PHY 34A again in this case.

Figure 8:
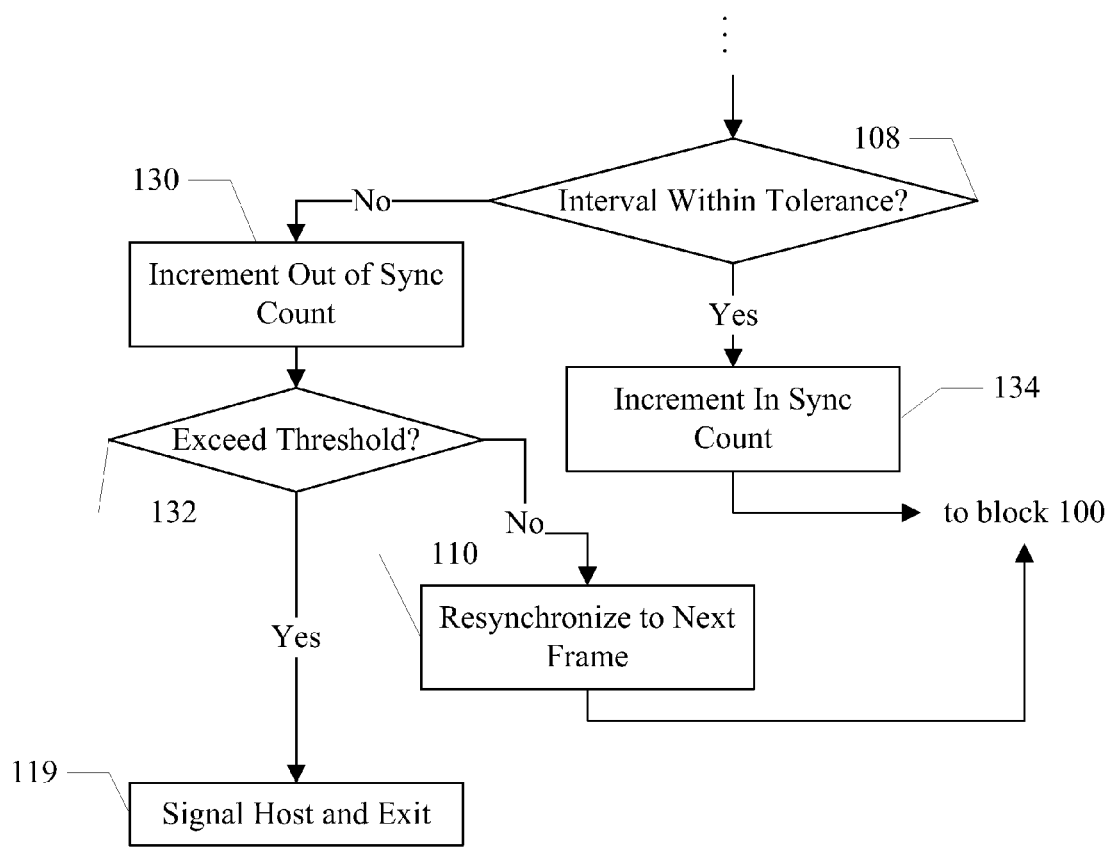
FIG. 8 is a flowchart illustrating an alternative embodiment of a portion of the operation shown in FIG. 6.

FIG. 8 is a flowchart illustrating operation of another embodiment of external PHY 34B in the mirrored mode. While the blocks are shown in a particular order for ease of understanding, other orders may be used. Blocks may be performed in parallel in combinatorial logic within the external PHY 34B. Blocks, combinations of blocks, and/or the flowchart as a whole may be pipelined over multiple clock cycles. The blocks shown in FIG. 8 may begin at the decision block 108, and operation prior to the decision block 108 in the flowchart may be similar to that shown in FIG. 6.

In the embodiment of FIG. 8, the external PHY 34B may monitor the frequency at which the PHY 34B (the secondary master) becomes out of synchronization with the PHY 34A (the primary master). For example, the external PHY 34B may count the number of start of frames that are outside of the window of tolerance (decision block 108, "no" leg and block 130 incrementing an out of sync count) and may also count the number of start of frames within the window of tolerance (decision block 108, "yes" leg and block 134 incrementing an in sync count). With the two counts, the relative frequency of out of sync events and in sync events may be determined. Alternatively, a single count may be incremented for in sync events and decremented for out of sync events, or vice-versa. The size of the count and it's sign may be used to determine relative frequency. Other embodiments may measure the frequency of out of sync and in sync events in other ways.

If the interval is within the tolerance (decision block 108, "yes" leg), the flowchart may return to block 100 in addition to updating the in sync count in block 134. If the interval is not within the tolerance (decision block 108, "no" leg), the external PHY 34 may determine if the number of out of sync events exceeds a desired threshold amount (decision block 132). The threshold may be programmable or fixed, in various embodiments. If the threshold has not been exceeded (decision block 132, "no" leg), the external PHY 34B may resynchronize to the next frame (block 110), and operation may return to block 100 in FIG. 6. If the threshold has been exceeded (decision block 132, "yes" leg), the PHY 34B may signal the host and exit (block 119).

It is noted that, while the PHY 34B is described as monitoring the frequency of out of sync and in sync events, other embodiments may implement the monitoring operation separate from the external PHY 34B. It is further noted that, in some embodiments, the out of sync and in sync counts may be accessible to software (e.g. executing on the processors 44). In still further embodiments, additional data may be gathered by the monitor. For example, the temporal variations in the difference between the start of frame signals within the tolerance may be recorded (e.g. as a histogram with a certain granularity). Such data may be analyzed to determine various system parameters, such as differences in the noise being experienced by the PHYs 34A-34B. The noise may be impacted by the use of different power supplies, for example. In some embodiments, the host may be configured to regulate the power supply, to minimize noise or to trade-off noise sensitivity against power consumption. Numerous other uses for such information are also possible.

Numerous variations and modifications will become apparent to those skilled in the art once the above disclosure is fully appreciated. It is intended that the following claims be interpreted to embrace all such variations and modifications.

What is claimed is:

1. A system comprising:
a first pixel processing unit coupled to receive a first pixel stream and configured to perform one or more pixel operations on pixels represented in the first pixel stream to generate a first processed pixel stream;
a second pixel processing unit coupled to receive a second pixel stream and configured to perform one or more pixel operations on pixels represented in the second pixel stream to generate a second processed pixel stream;
wherein the first pixel processing unit and the second pixel processing unit are in a first clock domain;
a first display driving circuit coupled to receive the first processed pixel stream and configured to drive a first panel to display frames described in the first processed pixel stream, wherein the first display driving circuit is in a second clock domain; and
a second display driving circuit coupled to receive the second processed pixel stream and configured to drive a second panel to display frames described in the second processed pixel stream, wherein the second display driving circuit is in a third clock domain;
wherein, in a mirrored mode, the first pixel stream and the second pixel stream are the same, and wherein the first display driving circuit is configured to control a synchronization interface to the second display driving circuit in the mirrored mode, and wherein the second display driving circuit is configured to trigger display of the second processed pixel stream responsive to the synchronization interface, and wherein the second display driving circuit is configured to drive the second panel responsive to the second processed pixel stream independent of the first display driving circuit, and wherein the second display driving circuit is configured to monitor the synchronization interface to remain within a threshold of synchronization with the first display driving circuit and to resynchronize to the first display driving circuit if not within the threshold.

2. The system as recited in claim 1 wherein the synchronization interface includes a start of frame indication.

3. The system as recited in claim 2 wherein the synchronization interface further includes a field indication.

4. The system as recited in claim 1 wherein, in a non-mirrored mode, the second pixel stream is different from the first pixel stream.

5. The system as recited in claim 4 wherein the second display driving circuit is configured to ignore the synchronization interface in the non-mirrored mode.

6. The system as recited in claim 1 wherein the second processed pixel stream differs from the first processed pixel stream even when the first pixel stream and the second pixel stream are the same.

7. A system comprising:
a first circuit configured to drive a first user interface device; and
one or more second circuits configured to drive one or more second user interface devices;
wherein, in a mirrored mode, the first circuit and the one or more second circuits are configured to independently process a same data stream, and wherein the first circuit is configured to control a synchronization interface to the one or more second circuits in the mirrored mode to synchronize operation of the first and second user interface devices within a synchronization tolerance, and wherein the one or more second circuits are configured to trigger processing of the data stream responsive to the synchronization interface, and wherein the one or more second circuits are configured to process the data stream independently unless the synchronization interface indicates that the first circuit and the one or more second circuits are out of synchronization beyond a threshold level.

8. The system as recited in claim 7 wherein the first user interface device and the one or more second user interface devices are video displays, and wherein the data stream comprises pixel data.

9. The system as recited in claim 8 wherein the synchronization interface includes a start of frame indication.

10. The system as recited in claim 7 wherein the first user interface device and the one or more second user interface devices are audio devices, and wherein the data stream comprises audio data.

11. The system as recited in claim 7 wherein the one or more second circuits are configured to monitor a frequency at which the first circuit and the one or more second circuits are out of synchronization beyond the threshold level.

12. The system as recited in claim 11 wherein the one or more second circuits are configured to interrupt a processor in response to the frequency exceeding a second threshold level.

13. A method comprising:
performing one or more pixel operations on pixels represented in a first pixel stream to generate a first processed pixel stream in a first pixel processing unit in a first clock domain;
performing one or more pixel operations on pixels represented in a second pixel stream to generate a second processed pixel stream in a second pixel processing unit in the first clock domain;
receiving the first processed pixel stream in a first display driving circuit in a second clock domain;
driving a first panel to display frames described in the first processed pixel stream by the first display driving circuit;
receiving the second processed pixel stream in a second display driving circuit in a third clock domain;
driving a second panel to display frames described in the second processed pixel stream by the second display driving circuit independent of the first display driving circuit;
controlling a synchronization interface by the first display driving circuit to the second display driving circuit in a mirrored mode in which the first pixel stream and the second pixel stream are the same;
triggering display of the second processed pixel stream responsive to the synchronization interface by the second display driving circuit;
monitoring the synchronization interface by the second display driving circuit to remain within a threshold of synchronization with the first display driving circuit; and
resynchronizing to the first display driving circuit by the second display driving circuit responsive to not being within the threshold.

14. The method as recited in claim 13 wherein the synchronization interface includes a start of frame indication.

15. The method as recited in claim 14 wherein the synchronization interface further includes a field indication.

16. The method as recited in claim 13 wherein, in a non-mirrored mode, the second pixel stream is different from the first pixel stream.

17. The method as recited in claim 16 further comprising ignoring the synchronization interface by the second display driving circuit in the non-mirrored mode.

18. The method as recited in claim 13 wherein the second processed pixel stream differs from the first processed pixel stream even when the first pixel stream and the second pixel stream are the same.

19. A method comprising:
driving a first user interface device by a first circuit in a first clock domain;
driving one or more second user interface devices by one or more second circuits in a second clock domain;
in a mirrored mode, independently processing a same data stream in the first circuit and the one or more second circuits;
controlling a synchronization interface from the first circuit to the one or more second circuits in the mirrored mode to synchronize operation of the first and second user interface devices within a synchronization tolerance;
triggering processing of the data stream in the one or more second circuits responsive to the synchronization interface; and
processing the data stream in the one or more second circuits independently unless the synchronization interface indicates that the first circuit and the one or more second circuits are out of synchronization beyond a threshold level.

20. The method as recited in claim 19 wherein the first user interface device and the one or more second user interface devices are video displays, and wherein the data stream comprises pixel data.

21. The method as recited in claim 20 wherein the synchronization interface includes a start of frame indication.

22. The method as recited in claim 19 wherein the first user interface device and the one or more second user interface devices are audio devices, and wherein the data stream comprises audio data.

23. The method as recited in claim 19 further comprising monitoring, in the one or more second circuits, a frequency at which the first circuit and the one or more second circuits are out of synchronization beyond the threshold level.

24. The method as recited in claim 23 further comprising interrupting, by the one or more second circuits, a processor in response to the frequency exceeding a second threshold level.

\* \* \* \* \*